(12) United States Patent
Royer (10) Patent No.: US 7,549,695 B2
(45) Date of Patent: Jun. 23, 2009

(54) DEVICE FOR MANIPULATING A TARPAULIN

(76) Inventor: Réal Royer, 5735, rue Barré, Saint-Hyacinthe, Quebec (CA) J2R 1E4

( * ) Notice: Subject to any disclaimer, the term of this patent is extended or adjusted under 35 U.S.C. 154(b) by 0 days.

(21) Appl. No.: 11/802,601

(22) Filed: May 24, 2007

(65) Prior Publication Data

US 2008/0290686 A1 Nov. 27, 2008

(51) Int. Cl.
*B60P 7/02* (2006.01)
(52) U.S. Cl. .................. 296/100.12; 296/165; 296/105
(58) Field of Classification Search ............ 296/100.12, 296/100.11, 165, 105, 100.14
See application file for complete search history.

(56) References Cited

U.S. PATENT DOCUMENTS

| 6,152,516 | A  | * | 11/2000 | Williams ...................... 296/98 |
| 6,905,161 | B2 | * | 6/2005 | Fliege et al. ........... 296/100.18 |
| 2002/0135199 | A1 | * | 9/2002 | Hanning ..................... 296/105 |
| 2004/0195858 | A1 | * | 10/2004 | Martin .................. 296/100.12 |

* cited by examiner

Primary Examiner—Joseph D Pape

(57) ABSTRACT

A device for manipulating a tarpaulin so as to selectively cover and uncover a top aperture of a container. The top aperture defines an aperture peripheral edge, the aperture peripheral edge including two substantially opposed substantially longitudinal segments. The tarpaulin is configurable between an extended configuration and a retracted configuration. In the extended configuration, the tarpaulin substantially covers the top aperture. In the retracted configuration, the tarpaulin is substantially retracted from the top aperture. The device includes an elongated guiding component defining a guiding component longitudinal axis. The guiding component is securable to the container so as to extend at least partially along at least one of the longitudinal segments. A tarpaulin mounting component is usable for attaching the tarpaulin thereto. A link, mechanically coupled to the guiding component, is longitudinally movable therealong between a link proximal position and a link distal position. The tarpaulin mounting component is operatively coupled to the link in a manner such that when the link is in the link proximal position, and the tarpaulin is attached to the tarpaulin mounting component, the tarpaulin is in the retracted configuration. When the link is in the link distal position and the tarpaulin is attached to the tarpaulin mounting component, the tarpaulin is in the extended configuration.

20 Claims, 5 Drawing Sheets

Fig. 4

DEVICE FOR MANIPULATING A TARPAULIN

FIELD OF THE INVENTION

The present invention relates generally to tarpaulins. More specifically, the present invention is concerned with a device for manipulating a tarpaulin.

BACKGROUND OF THE INVENTION

Vehicle cargo containers for transporting bulk material such as sawdust, gravel chip, cutter shavings and the like typically include open top boxes such as semi-trailers or the like defining side walls, a front wall, a rear wall and a floor. These open top containers are typically mechanically coupled to various types of vehicles such as cargo ships, railway carts and truck cabins for transporting goods between various locations.

During transportation in these so-called open top containers, there exists a substantial risk that a portion of the load may be blown out of the open top container by various physical phenomena such as vibration, aerodynamically created vacuum, wind or the like. If some of the load is accidentally blown out of the container it may potentially not only cause unnecessary wastage of the transported goods but may also create a dangerous situation.

For example, when the open-top container is attached to a truck cabin, some of the load accidentally blown out of the container may contaminate the road or highway as it whirls around thus causing dangerous ground road conditions. It may also be blown directly towards the windshield of following vehicles creating a potentially disastrous situation.

Accordingly, in many areas, regulations have been implemented for the carriage of various loads, particularly on public highways requiring that open top containers be provided with some type of covering structure for covering the loading aperture during transport. With the increasing number of accidents, these official requirements have become more and more stringent, sometimes requiring adequate coverage for the load on even short journeys.

Consequently, there has been an industry wide move to provide permanently installed flexible covers often referred to as tarpaulins or tarps that can be quickly rolled and unrolled by the driver so as to respectively allow selective uncovering and covering of the load. When these permanently installed tarpaulins are used only occasionally they may be stored on the vehicle in a folded condition and unfolded over the body as and when required.

Various configurations of tarpaulins have been proposed. However, two configurations have proven to be particularly popular. One such configuration is the so called end-rolled tarpaulin which is gathered at one of the longitudinal ends of the container when not in use and moved along the body of the container between operative and stored positions.

The end-rolled tarpaulins are typically gathered at the front end of the vehicle and are usually provided along their length with a number of transverse supporting bars which extend between the two longer side walls of the container. The end-rolled tarpaulins are typically moved by means of a pair of cables trained over pulleys and carrying the tarpaulins with them as they move. With such an arrangement, the movement of the tarpaulin typically moves the bows automatically out of the way so that the latter do not obstruct the re-loading through the top opening. The movement of the bows out of the way also reduces the risks of having the latter damaged by a new load.

The other type of permanently installed tarpaulins preferred by some haulers is commonly referred to as a side-rolled tarpaulin. The side-load tarpaulins typically, permanently extend the full length of the container body and are rolled and unrolled about a so-called rolling rod that also typically extends the full length of the container body.

Many devices exist for retracting an extending these tarpaulins. However, these devices are typically relatively complex. In addition, they often require that an intended user of the device climb onto the container onto which the tarpaulin retracting and extending device is positioned. This causes risks of injury to the intended user of these devices as the intended user may then fall from the container. In addition, these devices often require that the intended user perform movements in non-ergonomic positions, which may also lead to injuries.

In addition, in end-rolled tarpaulins, the bows typically slide over the top edge of the container. It often occurs that this top edge is damaged while the container is loaded. In these cases, the movement of the bows is not smooth, which may lead to problems in moving the tarpaulin between the retracted and operative configurations. In some cases, the bow may even drop off the edge of the container or the tarpaulin moving system may become damaged. Another disadvantage of these systems resides in that typically, the tarpaulin is not completely retracted from the top aperture when in the retracted configuration, which restricts access to the container. Yet another disadvantage of these systems resides in the bows are typically not linked to each other and are instead moved either by the tarpaulin as it is extended and retracted, or by the bows abutting against each other. This results in the creation of relatively large forces in the tarpaulin moving system, which requires that the whole system be built relatively robustly, with all the cost and weight disadvantages associated to a robust construction.

Against this background, there exists a need in the industry to provide a novel device for manipulating a tarpaulin.

An object of the present invention is therefore to provide a device for manipulating a tarpaulin.

SUMMARY OF THE INVENTION

In a broad aspect, the invention provides a device for manipulating a tarpaulin so as to selectively cover and uncover a top aperture of a container. The top aperture defines an aperture peripheral edge, the aperture peripheral edge including two substantially opposed substantially longitudinal segments. The tarpaulin is configurable between an extended configuration and a retracted configuration. In the extended configuration, the tarpaulin substantially covers the top aperture. In the retracted configuration, the tarpaulin is substantially retracted from the top aperture. The device includes an elongated guiding component defining a guiding component longitudinal axis. The guiding component is securable to the container so as to extend at least partially along at least one of the longitudinal segments. A tarpaulin mounting component is usable for attaching the tarpaulin thereto. A link, mechanically coupled to the guiding component, is longitudinally movable therealong between a link proximal position and a link distal position. The tarpaulin mounting component is operatively coupled to the link in a manner such that when the link is in the link proximal position, and the tarpaulin is attached to the tarpaulin mounting component, the tarpaulin is in the retracted configuration. When the link is in the link distal position and the tarpaulin is attached to the tarpaulin mounting component, the tarpaulin is in the extended configuration.

The proposed device is advantageous as it provides for a relatively smooth path along which the guiding component may be moved. Therefore, the device is conceived so as to facilitate the operation thereof and to minimize frictional forces that may occur between different components of the device. In turn, this ensures that the device is more reliable in operation and that the device may be used using a relatively small amount of material while remaining reliable.

Additionally, the device is conceived such that the guiding component is typically spaced apart by relatively a small distance from the aperture peripheral edge. Therefore, even if the aperture peripheral edge becomes damaged, which often occurs in top loaded containers, the device may continue to operate relatively smoothly.

The device is relatively easily operable by an intended user thereof using relatively simple and ergonomic steps.

The device is relatively economical to manufacture and is typically retrofittable to a conventional container.

In some embodiments of the invention, the tarpaulin mounting component may be relatively easily removed from the device so as to be exchanged with another elongated guiding component having different dimensions or different mechanical properties. This allows, for example, to accommodate loads having various shapes in the container. Advantageously, the tarpaulin mounting component used with the device may also be shaped so as to provide a relatively aerodynamic profile on the top of the container.

In some embodiments of the invention, the device is configured such that the tarpaulin mounting component pivots away from the top aperture when in the retracted configuration. In these embodiments, the interior of the container is therefore more easily accessible than in embodiments of the invention in which the tarpaulin mounting component would be simply slid towards the proximal end of the device.

Typically, many substantially longitudinally spaced apart tarpaulin mounting components are provided. In some embodiments, the tarpaulin mounting components are mechanically coupled to each other by a coupling system so as to be all movable when one of the tarpaulin mounting component is moved. Therefore, the coupling system is typically the portion of the system that bears most of the mechanical loads resulting from the movements of the tarpaulins, as opposed to many prior art systems in which tarpaulin mounting components or the tarpaulin bear these loads. Therefore, the coupling system may be engineered so as to efficiently resist to these loads. For example, an accordion-type system of hinged levers may be used, which provides for a relatively strong structure at relatively low cost and relatively low weight.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 4, in a partial side elevation view, illustrates the device shown in FIGS. 1 to 3;

DETAILED DESCRIPTION

Figure 1:
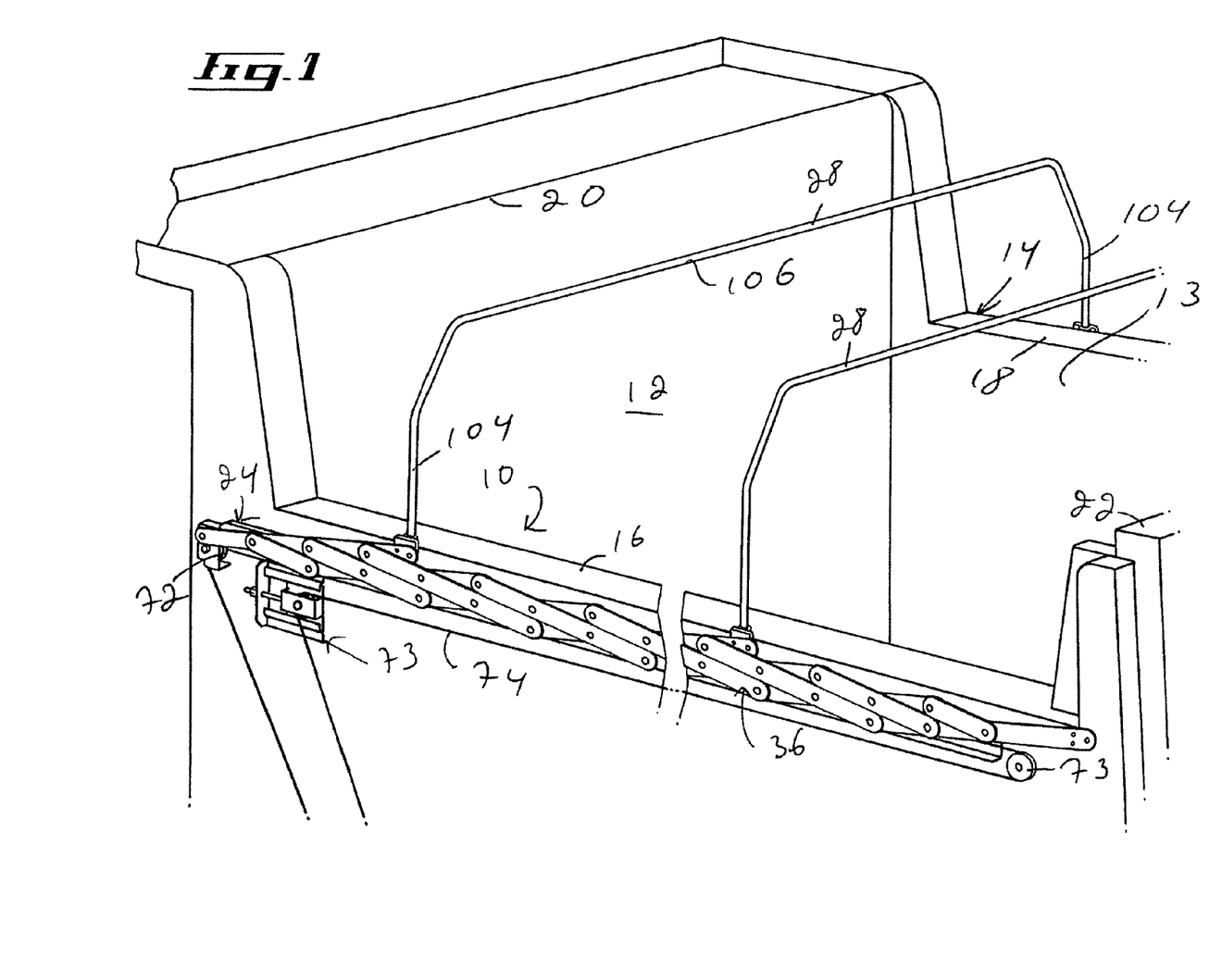
FIG. 1, in a partial perspective view, illustrates a device for manipulating a tarpaulin in accordance with an embodiment of the present invention.

FIG. 1 illustrates a device 10 for manipulating a tarpaulin (now shown in the drawings) so as to selectively cover and uncover a top aperture 12 of a container 13. Although, in the drawings, the container 13 is a container of a dump truck, it is within the scope of the invention to use the device 10 with any other suitable container. Also, the term container should be interpreted as being a relatively generic term describing any assembly having a peripheral wall defining a top aperture to which one would like to have access. For example, the container could be a shed.

The top aperture 12 defines an aperture peripheral edge 14. The aperture peripheral edge 14 includes two substantially opposed longitudinal segments 16 and 18 and two lateral segments 20 and 22 extending between the longitudinal segments 16 and 18 substantially opposed to each other. Although the top aperture 12 has an aperture peripheral edge 14 having a substantially rectangular configuration in the drawings, it is within the scope of the invention to use a similar device 10 with any other suitable top aperture.

The tarpaulin is configurable between an extended configuration and a retracted configuration. In the extended configuration, the tarpaulin substantially covers the top aperture 12. In the retracted configuration, the tarpaulin is substantially retracted from the top aperture 12.

Figure 4:
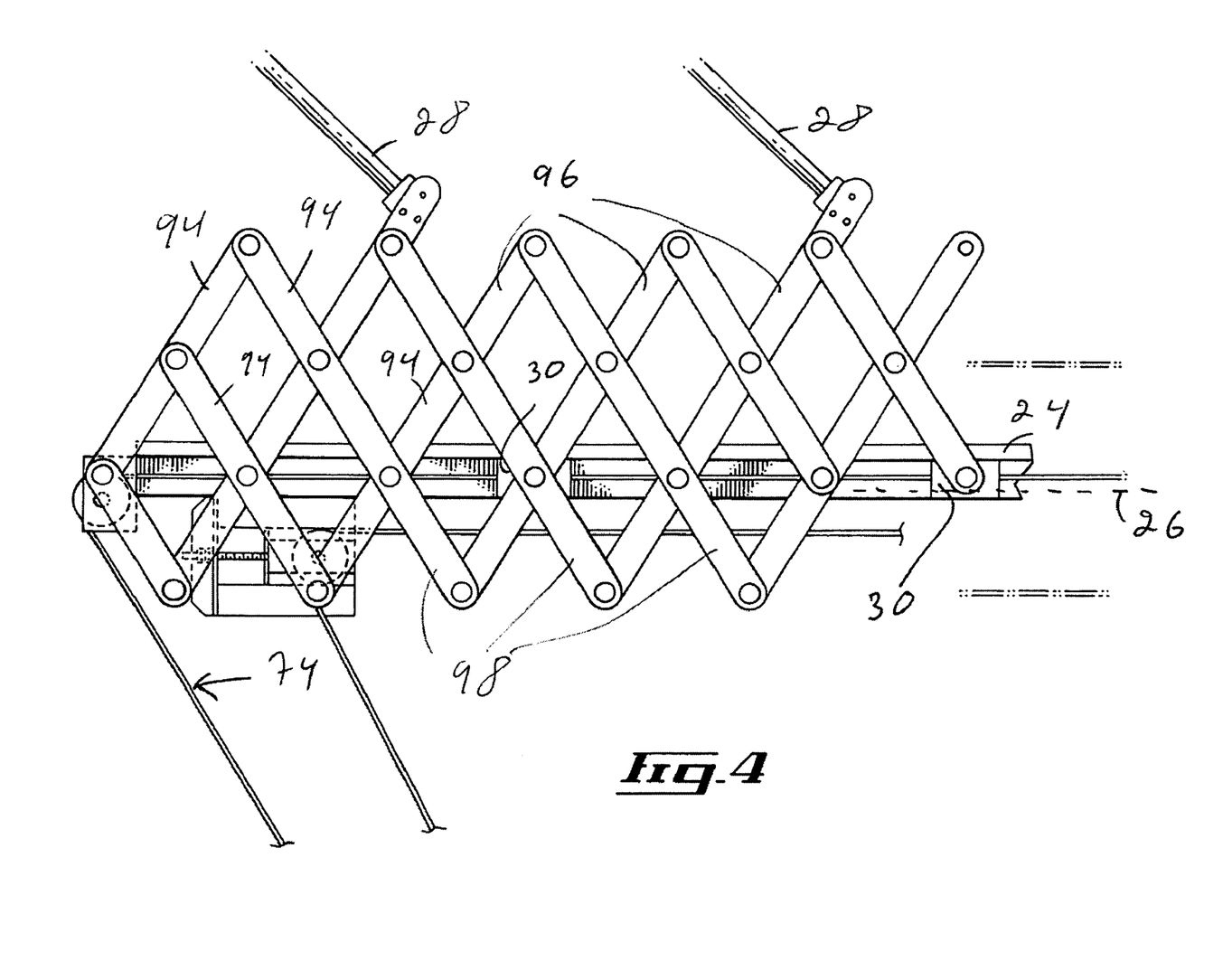

Referring to FIG. 4, the device 10 includes a guiding component 24 defining a guiding component longitudinal axis 26. The guiding component 24 is substantially elongated and is securable to the container 13 so as to extend at least partially along at least one of the longitudinal segments 16 and 18. Typically, the device 10 includes two elongated guiding components 24 disposed on opposed sides of the top aperture 12 and each extending along a respective one of the longitudinal segments 16 and 18.

Throughout this document, the terminology "distal" and "proximal" will be used to refer to the device 10. "Proximal" refers to locations located substantially adjacent the front of the dump truck and "distal" refers to locations located opposed to this location, in other words, close to the rear end of the dump truck. "Proximal" refers to locations at which the tarpaulin is stored when the tarpaulin is in the retracted configuration. This terminology is used for clarity reasons and should not be used in any manner to restrict the scope of the appended claims.

Figures 2, 3:
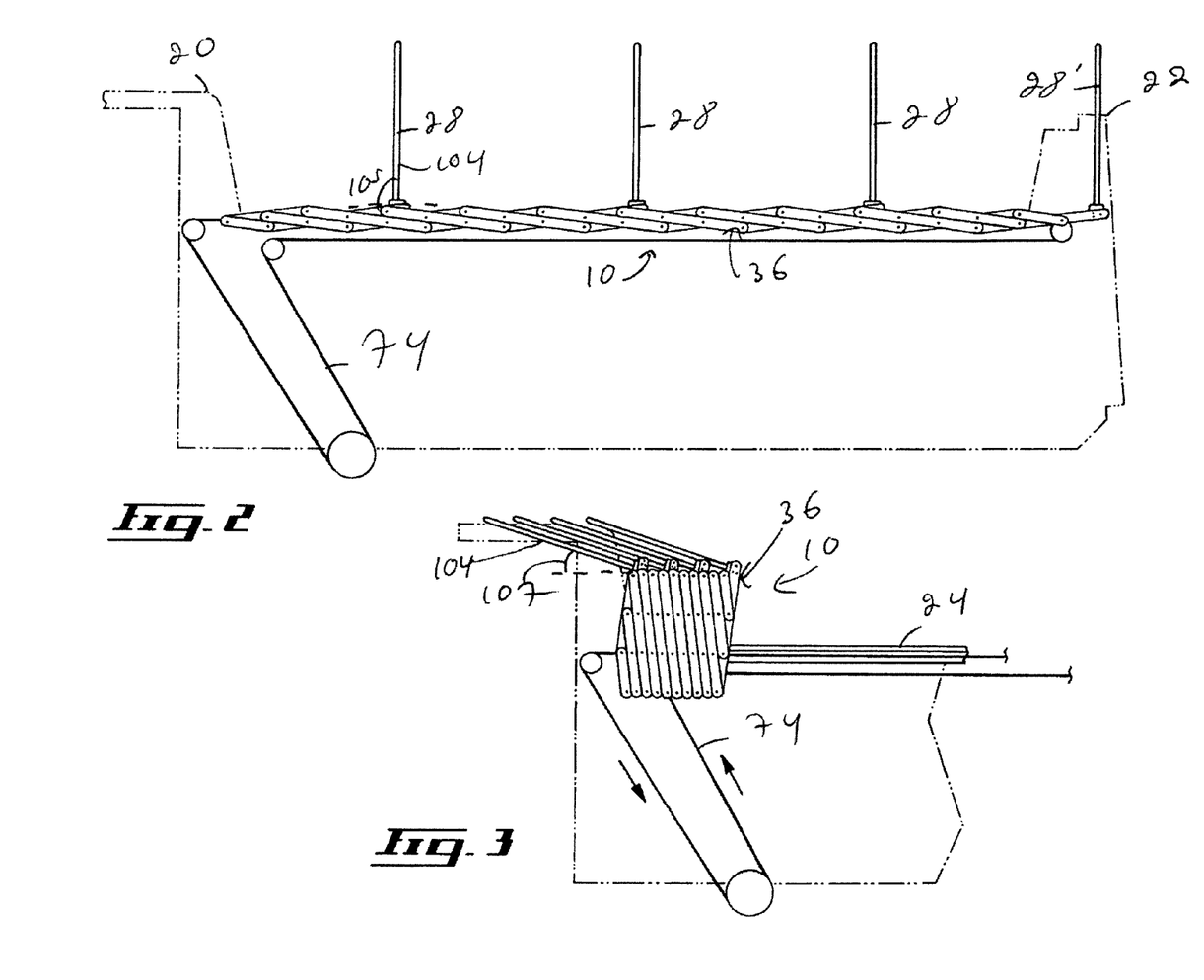
FIG. 2, in a side elevation view, illustrates the device shown in FIG. 1 mounted to a container in the form of a dump truck, the device being shown in an extended configuration.
FIG. 3, in a partial side elevation view, illustrates the device shown in FIGS. 1 and 2, the device being shown in the retracted configuration.

The device 10 includes tarpaulin mounting components 28, better seen in FIG. 1, usable for attaching the tarpaulin thereto. The tarpaulin mounting components 28 are provided in any suitable number. For example, the device 10 may include two, three, four or any other suitable number of tarpaulin mounting components. The tarpaulin mounting components 28 typically extend across the top aperture 12 between the longitudinal segments 16 and 18. Typically, the distalmost tarpaulin mounting component 28', also referred to as the distal tarpaulin mounting component 28' and better seen in FIG. 2, is mechanically coupled to the guiding components 24 of the device 10 in a manner such that it is substantially adjacent the distal lateral segment 22 when the tarpaulin is in the extended configuration, so as to allow substantially covering entirely the top aperture 12. However, it is within the scope of the invention to have devices similar to the device 10 in which only a portion of the top aperture 12 is covered when the tarpaulin is in the extended configuration.

As better seen in FIG. 4, the device 10 also includes links 30 mechanically coupled to the guiding component 24 so as to be longitudinally movable therealong between a link proximal position and a link distal position. Typically, at least two links 30 are mechanically coupled to each of the guiding components 24 of the device 10. For example, the number of links 30 mounted to each of the guiding components 24 is equal to the number of tarpaulin mounting components 28 of the device 10.

The tarpaulin mounting components 28 are operatively coupled to the links 30 in a manner such that when the distalmost link 30 is in the link proximal position and the tarpaulin is attached to the tarpaulin mounting component as seen, for example, in FIG. 3, the tarpaulin is in the retracted configuration. When the distalmost link 30 is in the link distal position and the tarpaulin is attached to the tarpaulin mounting component 32, the tarpaulin is in the extended configuration.

Typically, the device 10 also includes an actuator 38 operatively coupled to the links 30 for moving the links 30 along the guiding component 24. However, in alternative embodiments of the invention, no actuator is provided and the device 10 is operated by the intended user manually manipulating at least a portion of the device 10 so as to move the distalmost link 30 between the proximal and distal positions.

The links 30 are mounted to the guiding components 24 so as to be slidable therealong in some embodiments of the invention. More specifically, the link 30 and the guiding component 24 are configured and sized so as to substantially prevent the link 30 from moving relatively to the guiding component 24 in a direction substantially perpendicular to the guiding component longitudinal axis 26. Typically, in these embodiments, the link 30 and the guiding components 24 are configured and sized so as to substantially prevent the link 30 from moving relatively to the guiding component 24 in a plane substantially perpendicular to the guiding component longitudinal axis 26. In other words, the guiding component 24 restrains the link 30 to move along a single direction and motions in any direction perpendicular to this motion direction are substantially prevented from occurring.

This configuration allows to transmit relatively small forces and impacts to the guiding components 24 through the link 30 when the device 10 is in operation, which improves the durability and reliability of the guiding component 24.

Use of a sliding motion instead of a rolling motion in cases in which the link 30 would be replaced by a roller is advantageous as rollers have a relatively small compact surface onto which they roll, which could cause deformations of the guiding component 24 when vibrations transmitted to the links 30 when the device 10 is in operation. However, in alternative embodiments of the invention, these vibrations and transmitted forces are relatively weak and a wheel or any other typical rollers is usable to mount the tarpaulin mounting components 28 to the guiding component 24.

The links 30 mounted to each of the guiding components 24 are coupled to each other using a link coupling component 36 that is mechanically coupled to at least some, and typically to all of the links 30 mounted to each of the guiding components 24. The link coupling component 36 is configurable in a coupling component retracted configuration as shown, for example, in FIG. 3 and a coupling component extended configuration as shown, for example, in FIG. 2. The links 30 are closer to each other in the coupling component retracted configuration than in the coupling component extended configuration. Typically, the tarpaulin mounting components are coupled to the links and to the link coupling components in a manner such that the tarpaulin mounting components are closer to each other in the retracted configuration than in the extended configuration.

Figures 6, 7, 8:
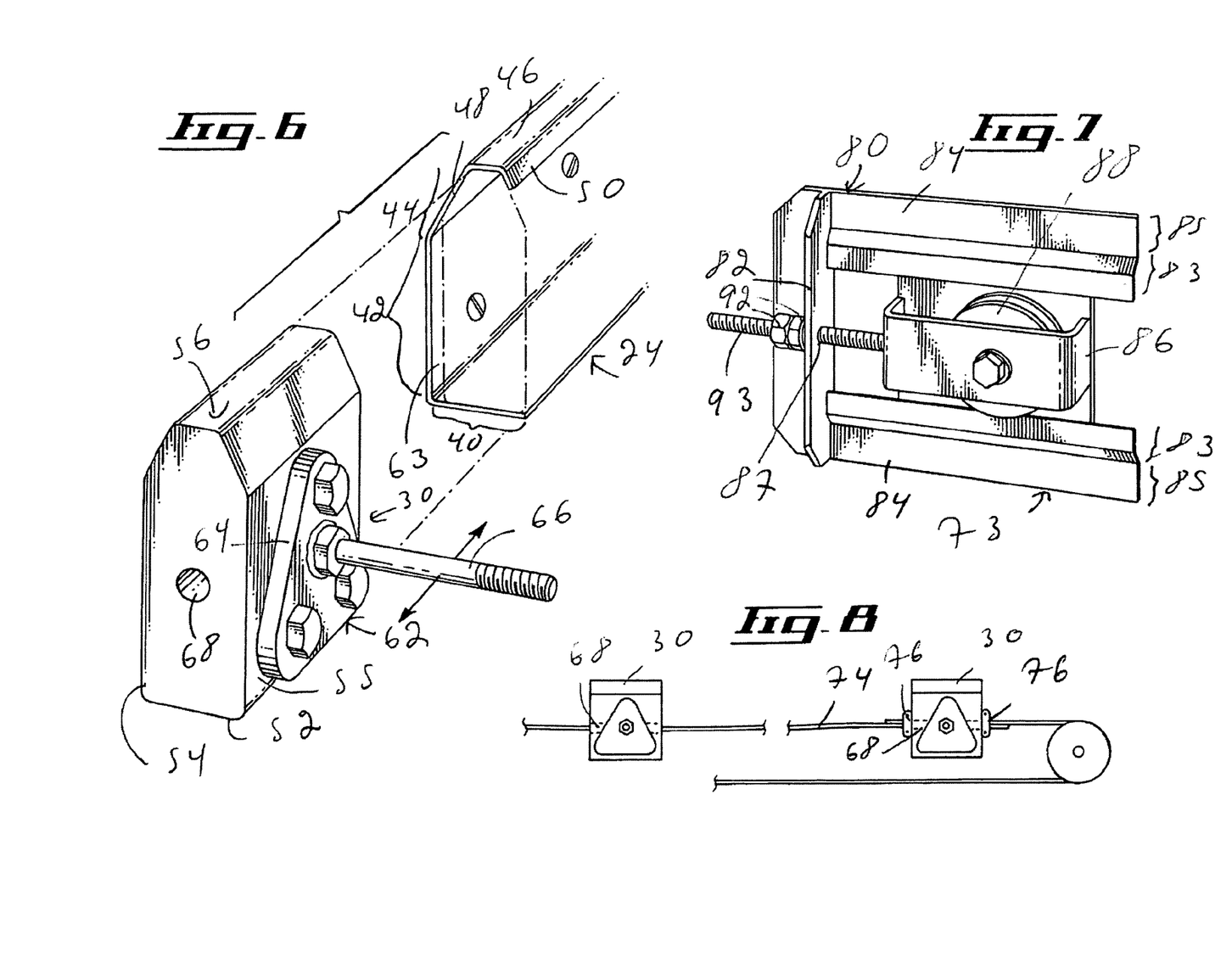
FIG. 6, in a perspective view, illustrates a portion of a guiding component and a link of the device shown in FIGS. 1 to 5.
FIG. 7, in a perspective view, illustrates a tensioning device usable in the device shown in FIGS. 1 to 5.
FIG. 8, in a partial side elevation view, illustrates the attachment of the link shown in FIG. 6 to a cable used in an actuator of the device shown in FIGS. 1 to 5.

Referring to FIG. 6, the guiding component 24 includes guiding component first, second and third sections 40, 42 and 44. The first and third sections 40 and 44 are substantially opposed to each other and the second section 42 extends therebetween. The third section 44 has a substantially inverted flattened V-shaped configuration and faces a substantially planar first section 40. Therefore, the link 30 is restrained in a direction leading from the first section 40 to the third section 44 by being inserted in-between these two sections and abutting against the first and the third sections 40 and 44. The inverted flattened V-shaped configuration of the third section 44 substantially prevents the link 40 from moving in a direction leading away from the second section 42.

The third section 44 includes a third section end wall 46 which is substantially parallel to the first section 40. Two third section angled walls 48 and 50 extend from the third section end wall towards the first section 40 and are tapered in a direction leading towards the third section end wall 46. The third section angled wall 48 extends between the third section lateral end wall 46 and the third section 42.

The link 30 has an irregular hexagonal shape. To that effect, the link 30 defines link first, second and third walls 52, 54 and 56 generally corresponding to the guiding component first, second and third sections 40, 42 and 44. The link first wall 52 is substantially planar and extends substantially parallel to the guiding component first section 40. The link second wall 54, and a substantially opposed and parallel link fourth wall 55, both extend substantially perpendicularly from the link first wall 52. The link second and fourth walls 54 and 55 are substantially parallel to the guiding component second section 42. The link third section 56 has a substantially flattened inverted V-shaped configuration, similar to the guiding component third section 44 and is typically shaped so as to engage the third section end and angled walls 46, 48 and 50. In some embodiments of the invention, the link 30 is dimensioned such that a gap 63 is formed between the link second wall 54 and the guiding component second section 42 when the link 30, so as to reduce frictional forces between these two components.

The link 30 also includes a link coupling component mounting bracket 62. The link coupling component mounting bracket 62 includes a bracket base 64 extending from the link fourth wall 55 and a bracket pin 66 extending substantially perpendicularly therefrom. A link passageway 68 is provided through the link second section 52 and extends substantially longitudinally so as to allow coupling to the actuator 38, as described in further details hereinbelow.

As better illustrated in FIG. 4, the link coupling component includes levers 94 interconnected to each other so as to form a plurality of scissor-type hinges, this configuration being also known as an accordion-type hinge. To that effect, the link coupling component 36 includes a first set of levers 96 that are substantially parallel to each other and a second set of levers 98 that are also substantially parallel to each other. The levers 94 from the first set of levers 96 each intersect a sub-set of the levers 94 from the second set of levers 98 and are hingedly attached to these levers 94 at the intersection location. This configuration for the link coupling component 36 is advantageous as it is relatively compact in the retracted configuration while allowing to extend over a relatively large distance in the extended configuration. As shown by the phantom lines of FIG. 4, which represent different positions of the guiding component 24 and a loop of wire 74, described in further details hereinbelow, relatively to the link coupling component 36, in some embodiments of the invention, the link coupling component 36 is attachable to the links 30 at different locations in a lateral direction so as to allow changing the height over which the tarpaulin mounting components 28,extend over the guiding component 24.

For example, as seen in FIG. 4, the guiding component 24 shown in the drawings is mountable at three different lateral positions relatively to the guiding components 24. This allows not only to configure the device 10 according to the type of containers to which it is fitted but also to adjust for different shapes and heights of loads in the container 10.

Referring to FIG. 1, each of the tarpaulin mounting components includes two spacing segments 104 extending from a respective one of the link coupling component 36 and a tarpaulin mounting segment 106 extending between two substantially laterally opposed spacing segments 104. Typically, the spacing segments 104 and the tarpaulin mounting segments 106 are integral with each other and shaped to fit the shape of the container 13 and of the load contained in the container 13.

In some embodiments of the invention, the specific configuration of the device 10 allows to relatively easily exchange of tarpaulin mounting components having different shapes and dimensions relatively easily to accommodate different mechanical loads, which depend on the type of tarpaulin mounted to the device 10 and on the speed at which the container 13 to is expected to move relatively to ambient air. These different shapes are also usable to adapt the shape of the tarpaulin when extended over the container according to aerodynamic forces and other environmental parameters relating to the exact manner in which the device 10 is used.

For example, having tarpaulin mounting components in which the spacing segments 104 increase in length from the proximal and towards the middle of the container 13 and then decrease in length towards the rear part of the container 13 allows to form a substantially dome shape onto the container 13 which, in some embodiments of the invention, improves the aerodynamic properties of the combined device, container and tarpaulin assembled.

Typically, the tarpaulin mounting components 28 are affixed to an end of one of the levers 94 of each of link coupling components 36 to which they are attached.

For example, the tarpaulin mounting component 28 extends generally perpendicularly, but not exactly perpendicularly each from a respective lever 94. Since the levers 94 are substantially parallel, but slightly angled relatively to the guiding component 24 when in the extended configuration and substantially perpendicular but also slightly angled relatively to the perpendicular direction, when in the retracted configuration, the small angle between the spacing segments 104 and the levers 96 allows to have a device 10 in which the spacing segment 104 is substantially perpendicular to the guiding component 24 when in the extended configuration, which is a configuration having good mechanical properties for maintaining the tarpaulin in the extended configuration. When passing to the retracted configuration, the spacing segments 104 rotate relatively to the guiding component and, therefore, in the retracted configuration, move the tarpaulin away from the top aperture 12.

In other words, the spacing segments 104 are angled at a first angle 105, shown in FIG. 2, relatively to the guiding component 24 when the link coupling component 36 is in the extended configuration and are angled at a second angle 107 relatively to the guiding component 24 when the link coupling component 36 is in the extended configuration.

The second angle 107 is substantially smaller than the first angle 105. Although a specific case in which the spacing component extends substantially perpendicularly to the guiding component 24 in the extended configuration is achieved in the embodiment shown in the drawings, typically, the first angle 105 is from about 80 to about 110 degrees and the second angle is from about 0 to about 30 degrees. However, other values are also within the scope of the present invention.

As seen in FIG. 1, the actuator 38 includes a proximal pulley 72 and a distal pulley 73. The proximal and distal pulleys 72 and 73 are mountable to the container 13 in a substantially longitudinally spaced apart relationship relatively to each other. A loop of wire 74 is mounted to the proximal and distal pulleys, the loop of wire 74 defining a link attachment segment positionable so as to extend substantially along the guiding component 24. The link attachment segment is attached to at least one of the links 30, typically the distalmost link 30.

Typically, the proximal pulley 72 is mountable to the container 13 substantially adjacent the link proximal position and the distal pulley 73 is mountable to the container substantially adjacent the link distal position. The link attachment segment is positionable between the proximal and distal pulleys 72 and 73.

As seen in FIG. 8, fasteners 76 are used to ensure that one of the links 30, typically the distalmost link 30, is fixed relatively to the loop of wire 74. The fasteners 76 substantially prevent relative longitudinal movements between the link 30 and the loop of wire 74. Also, the fasteners 76 may be used to close the loop of wire 74, which is formed from a linear piece of wire. All the other links 30 are mounted to the loop of wire 74 such that the loop of wire 74 extends through the link passageway 68.

Figure 5:
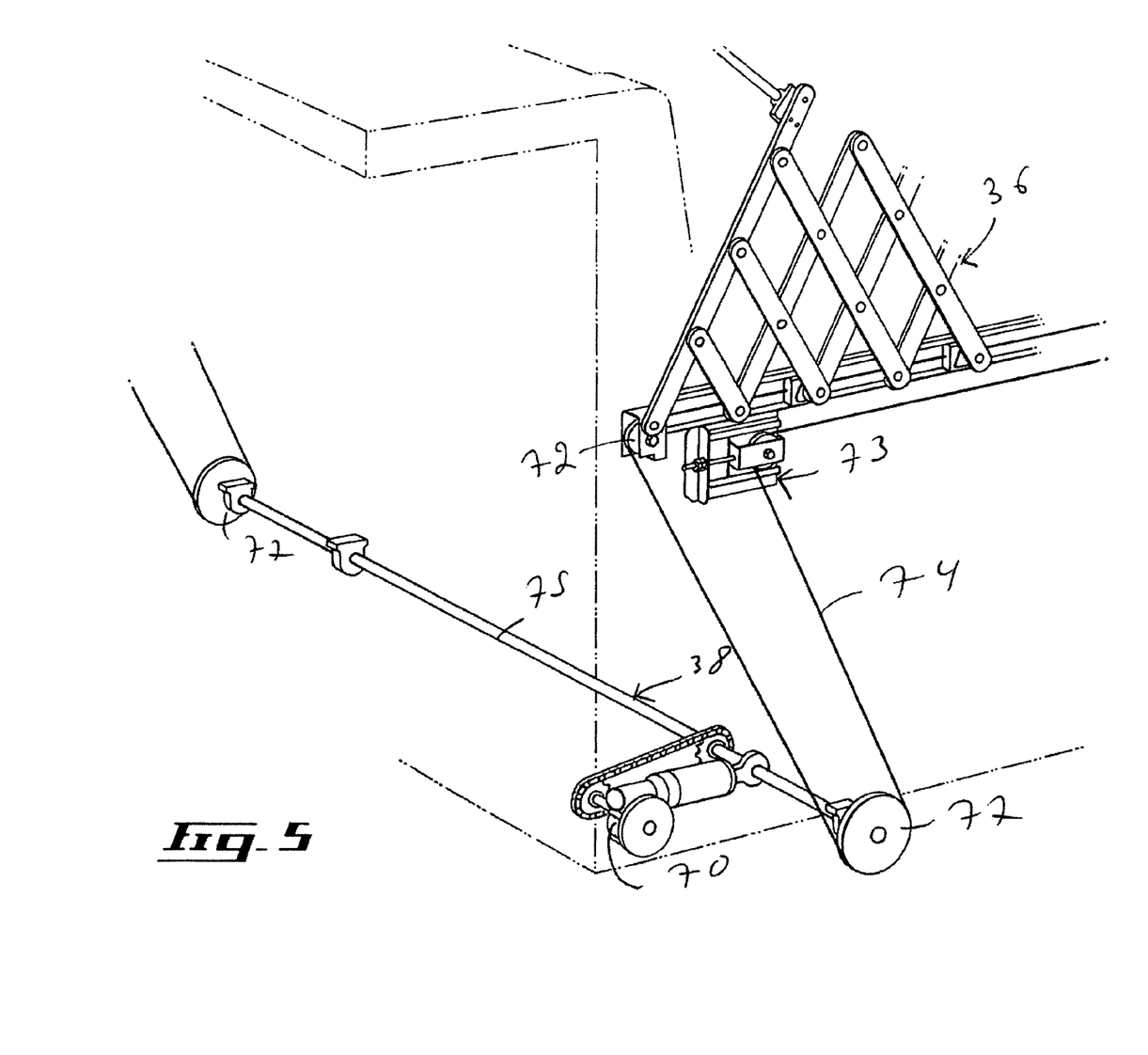
FIG. 5, in a partial perspective view, illustrates the device shown in FIGS. 1 to 5, the device being shown in a configuration intermediate the retracted and extended configurations.

Referring to FIG. 5, a motor 70 is operatively coupled to the loop of wire 74 for selectively moving the link attachment segment relatively to the guiding component 24, thereby moving the links 30 relatively to the guiding components 24. As shown, typically, a single motor 70 is usable to operate two loops of wire 74, each located on a respective lateral side of the container 13. To that effect, the motor 70 rotates an axle 75 linked to the respective pulleys 77. Each of the pulleys 77 engages a respective one of the loops of wires 74 and is therefore usable to move the links 30 relatively to the guiding components 24. The motor 70 is any suitable motor and may be an electrical motor, an hydraulic motor, a mechanical motor, or any other suitable motor or device able to move the loop of wires 74.

A tension adjusting device 73 is typically provided for ensuring a proper tension of the loop of wire 74 and for adjusting this tension when the loop of wire 74 stretches under operation. Also, the tensioning adjusting device 73 helps positioning the loop of wire 74 when first affixing the device 10 to the container 13 as it allows to affix the loop of wire under relatively small tension and then tension the loop of wire 74 to a tension suitable for operation.

The tension adjusting device 73 is better shown in FIG. 7 and includes a tension adjusting device base 80 from which a flange 82 extends substantially perpendicularly therefrom. The tension adjusting device base 80 is substantially U-shaped and includes two legs 84, each of the legs 84 defining a respective guiding portion 83. The legs 84 are substantially perpendicular to the flange 82. The guiding portions 83 are facing each other and are configured so as to be substantially spaced apart from the container 13 when the tensioning device 73 is affixed to the container 13. Container abutment portions 85 extend substantially laterally outwardly from the guiding portions 83.

The tension adjusting device 73 further includes a pulley carriage 86 to which a tensioning pulley 88 is mounted. The pulley carriage 86 has any suitable shape as long as it allows to relatively strongly hold the tensioning pulley 88. The pulley carriage 86 is mountable to the base legs 84 so as to be slidable longitudinally relatively thereto by engaging the guiding portions 83 and be maintained between the guiding portions and the container 13.

A threaded rod 90 extends substantially longitudinally from the pulley carriage 86 and is extending through an aperture 87 formed in the flange 82. Nuts 92 are provided for substantially preventing the threaded rod 90 from moving relatively to the flange 82 and allow adjusting a position of the pulley carriage 86 relatively to the flange 82 which, in turn, allows tensioning the loop of wire 74.

Therefore, the loop of wire 74 is mounted to the proximal and distal pulleys 72 and 73, to the pulley 77 and to the tensioning pulley 88. The loop of wire 74 defines a first segment extending substantially parallel to the guiding component 24 and a second segment extending angled relatively thereto so as to allow picking up the power of the motor 70 adjacent the bottom end of the container.

In use, when the device 10 is in the retracted configuration, the levers 94 are substantially parallel to each other and substantially vertically extending. In this configuration, the tarpaulin mounting components 30 are substantially horizontal and positioned so as to substantially clear the top aperture 12.

When the motor 70 is operated, the loop of wire 74 moves the distalmost link 30 onto the guiding components 24 substantially toward a distal end of the guiding components 24. In turn, this operates the scissor hinges in a manner such that an angle between the first set of levers 96 and the second set of levers 98 diminishes. Since the other links 30 are not attached to the loop of wire 74, they may slide relatively to the loop of wire 74 and are therefore free to move along the guiding component 24 under the constraint of the link coupling component 36.

When the distalmost link 30 reaches the distalmost position, the first and second sets of levers 96 and 98 are relatively close to being parallel to each other with only a small angle remaining therebetween due to their non-zero thicknesses. In this configuration, the spacing segments 104 extend substantially perpendicular to the guiding components 24 and the tarpaulin extends across the top aperture 12.

When the device 10 is operated from the extended to the retracted configurations, the above-mentioned steps are reversed.

Although the present invention has been described hereinabove by way of preferred embodiments thereof, it can be modified, without departing from the spirit and nature of the subject invention as defined in the appended claims.

What is claimed is:

1. A device for manipulating a tarpaulin so as to selectively cover and uncover a top aperture of a container, said top aperture defining an aperture peripheral edge, said aperture peripheral edge including two substantially opposed substantially longitudinal segments, said tarpaulin being configurable between an extended configuration and a retracted configuration, wherein, in said extended configuration, said tarpaulin substantially covers said top aperture, and, in said retracted configuration, said tarpaulin is substantially retracted from said top aperture, said device comprising:

an elongated guiding component defining a guiding component longitudinal axis, said guiding component being securable to said container so as to extend at least partially a long at least one of said longitudinal segments;

a tarpaulin mounting component usable for attaching said tarpaulin thereto; and a link mechanically coupled to said guiding component so as to be longitudinally movable therealong between a link proximal position and a link distal position;

said tarpaulin mounting component being operatively coupled to said link in a manner such that when said link is in said link proximal position and said tarpaulin is attached to said tarpaulin mounting component, said tarpaulin is in said retracted configuration, and when said link is in said link distal position and said tarpaulin is attached to said tarpaulin mounting component, said tarpaulin is in said extended configuration;

said tarpaulin mounting component including a substantially elongated lever mechanically coupled to said link so as to be longitudinally movable jointly therewith, a substantially elongated spacing segment extending from said lever, said spacing segment being angled at a fixed angle with respect to said lever, and a tarpaulin mounting segment extending from said spacing segment substantially opposed to said lever, said tarpaulin mounting segment extending substantially across said top aperture, said spacing segment being angled at a first angle relatively to said guiding component when said link is in said distal position and said spacing segment being angled at a second angle relatively to said guiding component when said link is in said proximal position, said second angle being substantially smaller than said first angle.

2. A device as defined in claim 1, wherein said link is mounted to said guiding component so as to be slidable therealong.

3. A device as defined in claim 2, wherein said link and said guiding component are configured and sized to substantially prevent said link from moving relatively to said guiding component in a predetermined direction extending substantially perpendicularly to said guiding component longitudinal axis.

4. A device as defined in claim 3, wherein said link and said guiding component are configured and sized to substantially prevent said link moving relatively to said guiding component in a plane extending substantially perpendicularly to said guiding component longitudinal axis.

5. A device as defined in claim 1, further comprising an actuator operatively coupled to said link for moving said link along said guiding component.

6. A device as defined in claim 5, wherein said actuator includes a proximal pulley and a distal pulley, said proximal and distal pulleys being mountable to said container in a substantial longitudinally spaced apart relationship relatively to each other; and a loop of wire mounted to said proximal and distal pulleys, said loop of wire defining a link attachment, segment positionable so as to extend substantially along said guiding component, said link attachment segment being secured to said link.

7. A device as defined in claim 6, wherein said proximal pulley is mountable to said container substantially adjacent said link proximal position and said distal pulley is mountable to said container substantially adjacent said link distal position, said link attachment segment being positionable between said proximal and distal pulleys.

8. A device as defined in claim 6, further comprising a motor, said motor being operatively coupled to said loop of wire for selectively moving said link attachment segment relatively to said guiding component.

9. A device as defined in claim 6, further comprising a tension adjusting device for selectively adjusting a tension in said loop of wire 10. A device as defined in claim 1, wherein said tarpaulin mounting component is a distal tarpaulin mounting component and said link is a distal link, said device further comprising a proximal tarpaulin mounting component for attaching said tarpaulin thereto and a proximal link mechanical coupled to said guiding component so as to be longitudinally movable therealong, said proximal tarpaulin mounting component being mechanically coupled to said proximal link so as to be longitudinally movable joints therewith.

11. A device as defined in claim 10, comprising a link coupling component mechanically coupled to said proximal and distal links, said lever being part of said link coupling component, said link coupling component being configurable in a coupling component retracted configuration and in a coupling component extended configuration, wherein said proximal and distal links are closer to each other in said coupling component retracted configuration than in said coupling component extended configuration.

12. A device as defined in claim 11, wherein said proximal and distal tarpaulin mounting components are mechanically coupled to said link coupling component in a manner such that said proximal and distal tarpaulin mounting components are closer to each other in said coupling component retracted configuration than in said coupling component extended configuration.

13. A device as defined in claim 12, wherein said distal and proximal tarpaulin mounting components each define a respective spacing segment extending from said link coupling component and a respective tarpaulin mounting segment extending substantially across said top aperture.

14. A device as defined in claim 13, wherein said spacing segment of said distal tarpaulin mounting component is angled at said first angle relatively to said guiding component when said link coupling component is in said extended configuration and said spacing segment of said distal tarpaulin mounting component is angled at said second angle relatively to said guiding component when said link coupling component is in said retracted configuration.

15. A device as defined in claim 14, wherein said first angle is from about 80 to about 110 degrees.

16. A device as defined in claim 14, wherein said second angle is from about 0 degrees to about 30 degrees.

17. A device as defined in claim 13, wherein said link coupling component is attachable to said proximal and distal links in a first attachment position and in a second attachment position, said tarpaulin mounting segments being located further away from said top aperture when said link coupling component is attached to said proximal and distal links in said second attachment position than in said first attachment position.

18. A device as defined in claim 13, wherein said link coupling component includes a scissor-type hinge extending between said proximal and distal links, said scissor-type hinge being configured and sized so as to allow variations in a distance between said proximal and distal links.

19. A device as defined in claim 1, comprising
a pair of elongated guiding components, said guiding components being securable to said container so that said guiding components extend at least partially each along a respective longitudinal segment with said guiding components substantially laterally opposed to each other relatively to said top aperture;
a pair of links each mechanically coupled to a respective one of said guiding components so as to be longitudinally movable therealong between a respective link proximal position and a respective link distal position;
said tarpaulin mounting component extending across said top aperture and being operatively coupled to both of said links and in a manner such that when said links are in said link proximal positions and said tarpaulin is attached to said tarpaulin mounting component, said tarpaulin is in said retracted configuration, and when said links are in said link distal position and said tarpaulin is attached to said tarpaulin mounting component, said tarpaulin is in said extended configuration.

20. A device for manipulating a tarpaulin so as to selectively cover and uncover a top aperture of a container, said top aperture defining an aperture peripheral edge, said aperture peripheral edge including two substantially opposed substantially longitudinal segments, said tarpaulin being configurable between an extended configuration and a retracted configuration, wherein, in said extended configuration, said tarpaulin substantially covers said top aperture, and, in said retracted configuration, said tarpaulin is substantially retracted from said top aperture, said device comprising:
an elongated guiding component defining a guiding component longitudinal axis, said guiding component being securable to said container so as to extend at least partially along at least one of said longitudinal segments;
a distal tarpaulin mounting component usable for attaching said tarpaulin thereto; and
a distal link mechanically coupled to said guiding component so as to be longitudinally movable therealong between a distal link proximal position and a distal link distal position, said distal tarpaulin mounting component being operatively coupled to said distal link in a manner such that when said distal link is in said distal link proximal position and said tarpaulin is attached to said tarpaulin mounting component, said tarpaulin is in said retracted configuration, and when said distal link is in said link distal position and said tarpaulin is attached to said tarpaulin mounting component, said tarpaulin is in said extended configuration;
a proximal tarpaulin mounting component for attaching said tarpaulin thereto and a proximal link mechanically coupled to said guiding component so as to be longitudinally movable therealong, said proximal tarpaulin mounting component being mechanically coupled to said proximal link so as to be longitudinally movable jointly therewith
a link coupling component mechanically coupled to said proximal and distal links, said link coupling component being configurable in a coupling component retracted configuration and in a coupling component extended configuration, wherein said proximal and distal links are closer to each other in said coupling component retracted configuration than in said coupling component extended configuration,
said proximal and distal tarpaulin mounting components being mechanically coupled to said link coupling component in a manner such that said proximal and distal tarpaulin mounting components are closer to each other in said coupling component retracted configuration than in said coupling component extended configuration;

said distal and proximal tarpaulin mounting components each defining a respective spacing segment extending from said link coupling component and a respective tarpaulin mounting segment extending substantially across said top aperture said spacing segment of said distal tarpaulin mounting component being angled at a first angle relatively to said guiding component when said link coupling component is in said extended configuration and said spacing segment of said distal tarpaulin mounting component being angled at a second angle relatively to said guiding component when said link coupling component is in said retracted configuration, said second angle being substantially smaller than said first angle, said first angle being from about 80 to about 110 degrees.

* * * * *